Jan. 14, 1958
L. GIMBEL
2,819,488
SHIRRING APPARATUS
Filed July 7, 1954
4 Sheets-Sheet 1
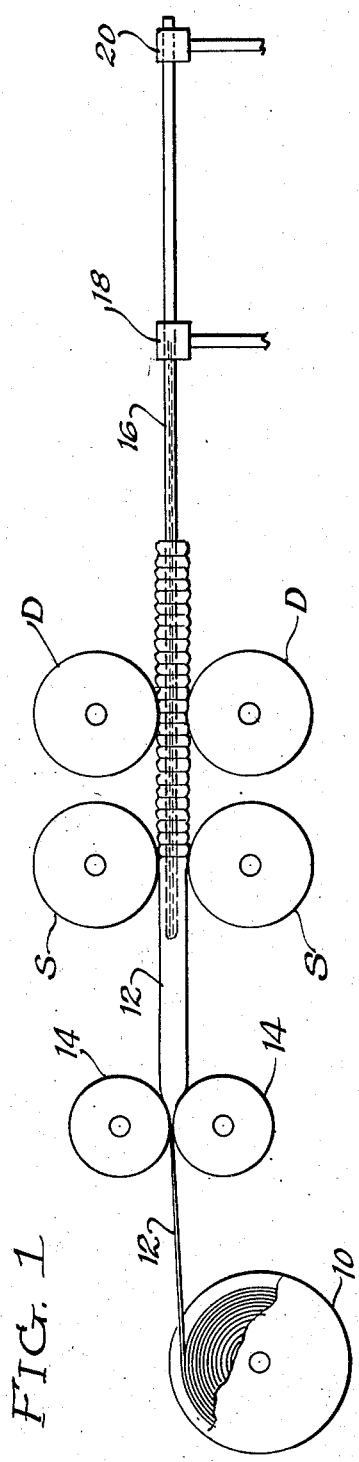
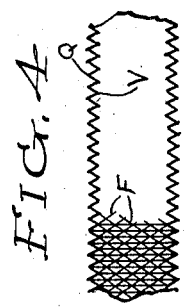
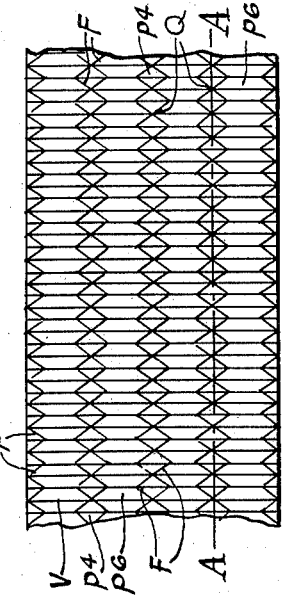
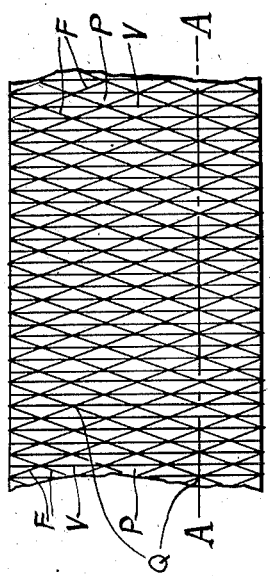
INVENTOR.
Lawrence Gimbel
BY
Harry H. Levin
Att'y Jan. 14, 1958
L. GIMBEL
2,819,488
SHIRRING APPARATUS
Filed July 7, 1954
4 Sheets-Sheet 2
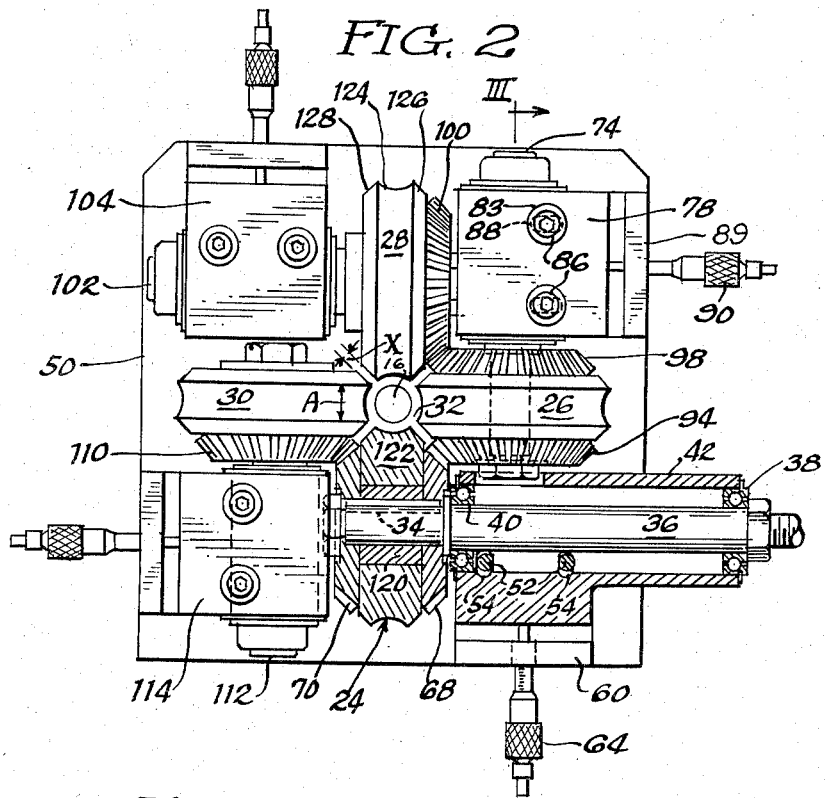
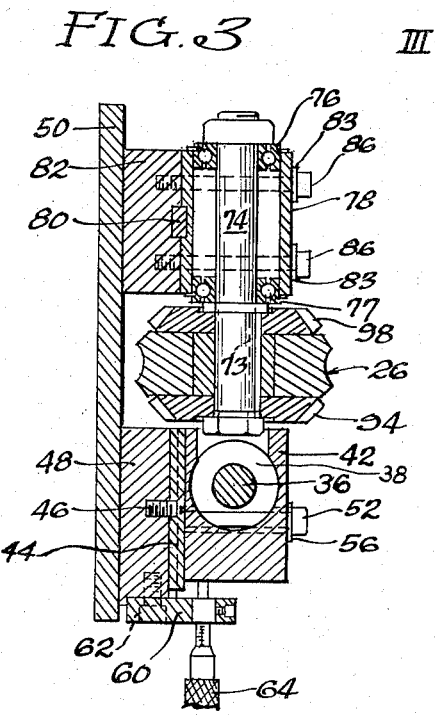
INVENTOR.
Lawrence Gimbel
BY Harry H. Levin
Att'y FIG. 7 FIG. 8 FIG. 9 FIG. 10
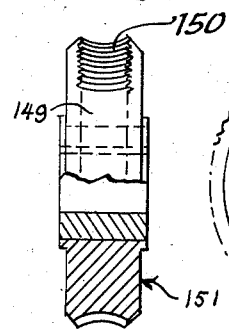
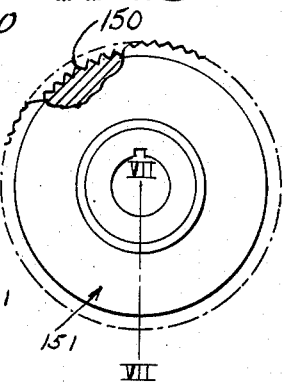
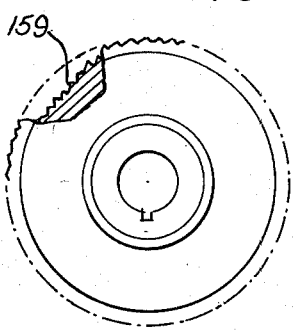
FIG. 11
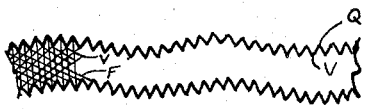
FIG. 12 FIG. 13
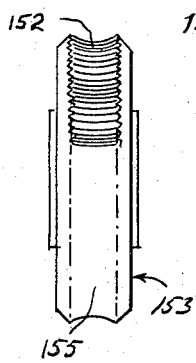
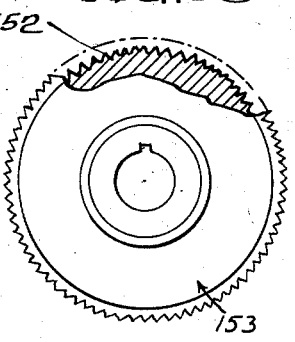
FIG. 14
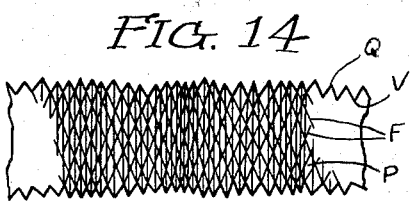
FIG. 15
FIG. 16 FIG. 17
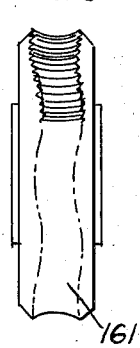
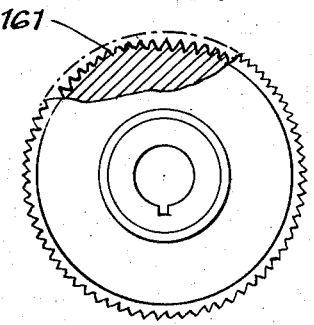
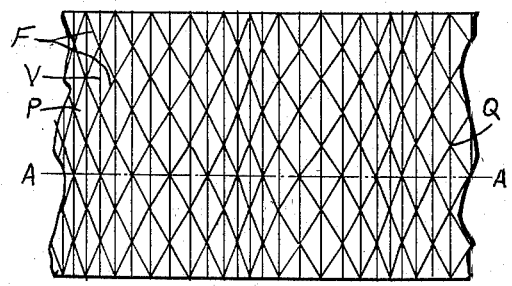
INVENTOR.
Lawrence Gimbel
BY Harry M. Levin
Atty

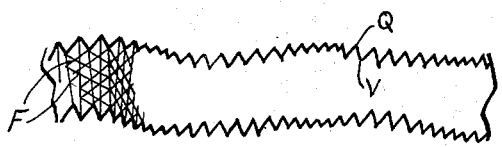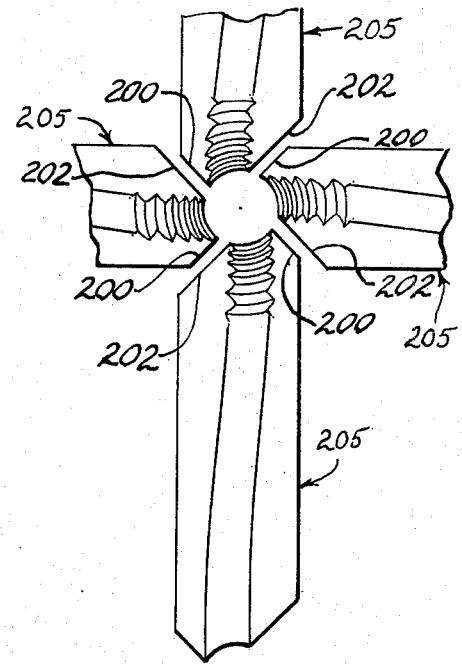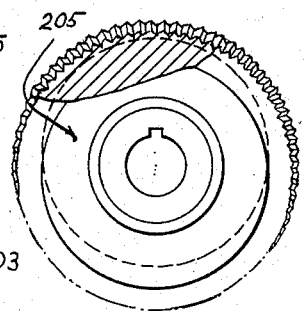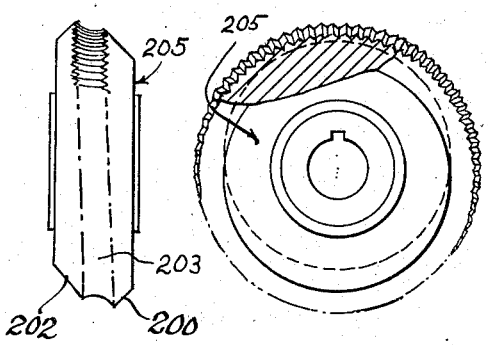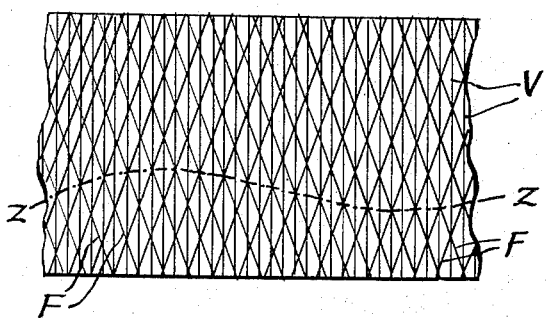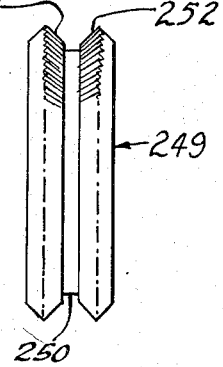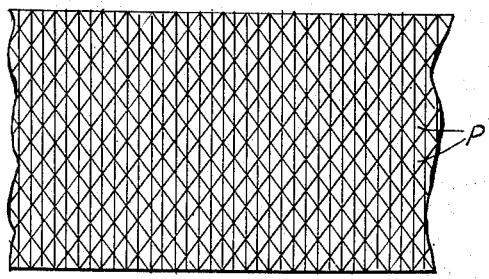

United States Patent Office 2,819,488
Patented Jan. 14, 1958

2,819,488

SHIRRING APPARATUS

Lawrence Gimbel, Broadview, Ill., assignor, by mesne assignments, to Union Carbide Corporation, a corporation of New York Application July 7, 1954, Serial No. 441,801

16 Claims. (Cl. 17—42)

This invention relates to an apparatus for shirring flexible tubing. More particularly, it relates to an apparatus for shirring flexible cellulose (regenerated) tubes to produce shirred cellulose casings which are used extensively as sausage casings.

Cellulose (regenerated) casings are used extensively in the manufacture of skinless frankfurters and wieners. In practice, a cellulose tube of an appropriate length such as 32', 40', 55' or more is shirred and then compressed to produce (what is commonly termed in the art) a stick of from about 6" to 10" in length, and such stick is positioned on a horn of a stuffing apparatus and thereafter stuffed. The stuffed tube is then linked and processed as is well known in the art to produce skinless frankfurters.

An object of this invention is to provide a new and improved apparatus for shirring tubes.

Another object of this invention is to provide a shirring apparatus which controls within limits the size, shape and placement of the pleats.

An additional object of this invention is to provide a mechanically simple tube shirring apparatus capable of operating with a minimum of noise and at a high rate without excessive maintenance.

A further object of this invention is to provide a shirring mechanism which does not substantially damage the tubing.

Other and further objects will become apparent hereinafter.

The objects of the invention are accomplished in general by passing an inflated tube to and through a passage formed by a plurality of rotating shirring rolls and over a mandrel to a metering device feeding the tube therefrom at a speed less than the peripheral speed of the shirring rolls.

The shirring rolls continuously feed the inflated tube forwardly at the same rate of speed but since the tube is retarded by the metering device, the tube gathers into a substantially uniformly pleated mass which is delivered by the metering device along the mandrel. A stop spaced from the metering device and cooperating with the mandrel engages and limits the forward movement of the leading end of the tube on the mandrel. The shirring operation is continued until a tube of predetermined length has been shirred. Finally, the shirred tube is compressed to produce a stick.

The shirring rolls are arranged to provide between the peripheral surfaces thereof, a passage of such dimension so that when the inflated tube passes therethrough, each roll will contact and indent the tube without forcing the wall of the tube into contact with the mandrel. Preferably, in any setup, the rolls are of the same dimensions and the center lines of the cores i. e. center axis of the rolls are equidistantly spaced from the center of the passage. Any number of rolls may be used and the invention is not restricted to any precise number. In general, however, the greater the number of rolls constituting the shirring rolls, the more circular in cross section will the product be. It is to be noted that when two rolls are used, a product substantially elliptical in cross section can be obtained and such embodiment is included in this invention. For producing a product substantially circular in cross section an embodiment having four rolls is preferred because of its mechanical simplicity in the general design and number of parts.

The peripheral surface of the shirring rolls engaging the tubing can be smooth. To provide a higher degree of traction or better grip on the tube, the portion of the peripheral surface of the roll contacting the tube is in the form of a concave continuous smooth annular groove. The groove may follow a serpentine path or be of such shape that in the assembly it will impart an eccentric action to the tube. To better control the pitch of the pleats in the product and furnish additional traction, the tube contacting peripheral surface of each shirring roll is provided with transversely extending teeth, the pitch thereof being in accordance with the desired pitch of the pleats. The teeth may be of the same pitch or of variable pitch and when the latter is utilized, the teeth may alternately gradually increase from a certain minimum to a maximum pitch and then gradually decrease to the previously mentioned minimum pitch.

It is to be noted that in the shirring operation, the cylindrical tube collapses into a multitude of diamond shaped pleats represented by diagonal fold lines and connecting vertical fold lines (as hereafter more fully described) and that the greater number of pleats in a shirred length of tube the longer the resulting length of the compressed shirred tubing, i. e., shirred stick. As will appear hereinafter, the invention provides means for producing shorter sticks as well as sticks having reduced tendency to elongate after compression.

In general, the metering device consists of means to engage the inflated tube after passage through the shirring rolls and feed the tube at a rate considerably less than that of the shirring rolls. The metering device may be formed of various moving elements arranged to form a passage therebetween for the tube such as a plurality of belts or rolls with or without cleats, teeth, etc.

The nature of the invention and the manner in which it may be practiced will become clear from the following detailed description when taken in connection with the accompanying drawings illustrating several embodiments of the invention and wherein, Figure 1 is a side elevation (diagrammatic) of one embodiment of the shirring apparatus constituting this invention.

Figure 2 is an enlarged elevation, partially in section of a shirring apparatus having four rolls.

Figure 3 is a section taken on line III—III of Figure 2.

Figure 4 is a cross section of a short length of a tube after shirring but before compression.

Figure 5 is a section of the casing shown in Figure 4 which has been split in a direction parallel to the longitudinal axis, flattened and smoothed.

Figure 6 is a flattened and smoothed section of a shirred tube having a modified form of pleat pattern.

Figure 7 is a section of a modified form of shirring roll on the line VII—VII of Figure 8, partially in elevation.

Figure 8 is a side elevation partly broken away, of the roll shown in Figure 7.

Figure 9 is an elevation of still another modified form of shirring roll.

Figure 10 is a side elevation, partly broken away, of the roll shown in Figure 9.

Figure 11 is a cross section of a short length of a shirred tube produced by rolls shown in Figures 9 and 10, and before compression.

Figure 12 is an elevation of another form of shirring roll.

Figure 13 is a side elevation partly broken away, of the roll shown in Figure 12.

Figure 14 is a cross section of a short length of a shirred tube produced by rolls shown in Figures 12 and 13 and before compression.

Figure 15 is a section of the shirred tubing shown in Figure 14 which has been slit in a direction parallel to its longitudinal axis, flattened and smoothed.

Figure 16 is an elevation of another form of shirring roll.

Figure 17 is a side elevation partly broken away of the roll shown in Figure 16.

Figure 18 is a cross section of a short length of a shirred tube produced with rolls shown in Figures 16 and 17 and before compression.

Figure 19 is a modification (diagrammatic) of a shirring roll assembly on an enlarged scale.

Figure 20 is an elevation of one of the shirring rolls shown in Figure 19.

Figure 21 is a side elevation partly broken away of the roll shown in Figure 20.

Figure 22 is a section of shirred tubing produced by the setup shown in Figure 19 and slit in a direction parallel to the longitudinal axis, flattened and smoothed.

Figure 23 is an elevation of still another modified form of shirring roll.

Figure 24 is a section of shirred tubing produced with shirring rolls of the type shown in Figure 23 split in a direction parallel to the longitudinal axis, flattened and smoothed.

The shirring rolls and metering device constituting one embodiment of this invention are adapted to be used as a component of and in place of the block or dog shirring mechanism of the apparatus shown in U. S. Patent No. 2,010,626. Since the details of the machine with which the present invention is to cooperate are described in the aforementioned patent and form no part of this invention, no detailed description thereof will be made herein.

Referring now to the drawings wherein several illustrative embodiments of the invention are shown and like reference numerals and characters designate like parts and in particular to Figure 1, the reference numeral 10 designates a reel holding in flat wound condition the tube 12 which is to be shirred. A pair of feed rolls 14 pull the tube 12 from the tube supply reel 10 and feed it in an inflated state, to a shirring roll mechanism generally designated by the reference character S which in turn feeds the inflated tube to delivery metering rolls generally designated by the reference character D. It is to be noted that the tube 12, in the inflated state is fed over a mandrel 16 which is supported by movable mandrel clamps 18 and 20 cooperating with the leading portion thereof. The portion of the mandrel 16 extending rearwardly of clamp 18 is formed with a bore through which an inflating medium such as air is supplied to the interior of the tube whereby the section of tube 12 between the feed rolls 14 and shirring rolls S is in an inflated state. The details of the feed rolls 14 the mandrel 16 and the mandrel clamps 18 and 20, as well as the means for supplying the inflating medium, are shown and described in U. S. Patent No. 2,010,626, and since such details form no part of this invention, no further description thereof is necessary.

The peripheral speeds of the feed rolls 14 and the shirring rolls S are approximately the same and the peripheral speed of the metering rolls D is considerably lower than that of the shirring rolls S. As a consequence, the shirring rolls S feed the inflated tubing passing therebetween at a speed equal to that at which the tube is received from the feed rolls 14. However, since the peripheral speed of the metering rolls D is lower than that of shirring rolls S, the speed of travel of the tube 12 after leaving the shirring rolls S is retarded by the metering rolls D with the consequence that the tube 12 gathers into a uniformly pleated mass which is delivered or pushed forward along the mandrel 16 by the metering rolls. Any appropriate drive may be used to drive the rolls at the desired differential speeds, such as drives similar to that illustrated in Patent No. 2,641,026 to Ambler.

The forward movement of the leading end of the pleated tube is limited by the clamp 18 and the shirring operation continues until a predetermined length of tube is shirred. Thereafter, the shirred tube is compressed against clamp 20 as is described in the aforementioned U. S. Patent No. 2,010,626.

In one embodiment of the invention, the shirring roll mechanism consists of four rolls, 24, 26, 28, 30, arranged as shown in Figure 2 of the drawings to provide a passage 32 through which the tube 12 passes and the mandrel 16 extends. The rolls 24, 26, 28, 30 are independently adjustable relative to each other and the passage 32. They are of the same dimensions and are rotated at the same peripheral speed as will now be described.

Roll 24 is secured as by means of a key 34 adjacent one end of a shaft 36, the other end of said shaft being driven by any suitable means not shown. The shaft 36 is mounted in ball bearings 38 and 40 carried by housing 42 which in turn is provided with a key way slidably disposed on a key 44 (see Figure 3) secured by a screw 46 to a block 48 appropriately secured to a machine frame member 50. Bolts 52 extending through elongated slots 54 serve to secure the housing to the block 48. Washers 56 are positioned intermediate the head of the bolt 52 and the face of the housing 42.

A bracket 60 secured to the block 48 by means of screws 62 carries a micrometer 64 which is adapted to accurately check the location of housing 42 on the key 44 and give the location of the roll. In order to adjust the roll 24 relative to the other rolls, bolts 52 are loosened and the housing 42 together with the shaft carried thereby is moved manually in the direction desired. After the desired movement has been effected, the bolts 52 are secured in position. The location of the housing 42 and hence the roll is checked with the micrometer 64.

For reasons which will become apparent hereinafter, miter gears 68 and 70 are keyed to shaft 36 adjacent the opposite faces of roll 24.

Roll 26 is appropriately secured as by means of a key 73 to one end of a shaft 74 which is rotatably mounted in ball bearings 76 and 77 carried by a housing 78 provided with a key way cooperating with a key 80 secured to a block 82 appropriately secured to the frame 50. The housing 78 is secured to block 82 by means of screws 86 cooperating with elongated slots 88. Washers 83 are positioned between the head of the screws 86 and the face of the housing. A micrometer 90 carried by a bracket 89 appropriately secured to the block 82 cooperates with the housing 78 to accurately check the position of said housing as desired. To position the roll 26 screws 86 are loosened and the housing 78 manually moves as desired. The screws 86 thereafter secure the housing 78 in adjusted position which is checked by the micrometer 90.

A miter gear 94, secured by key 73 to shaft 74, cooperates with miter gear 68 on shaft 36 whereby upon rotation of shaft 36, not only will roll 24 be rotated but roll 26 will also be rotated.

A miter gear 98 also secured by the key 73 to shaft 74 meshes with miter gear 100 keyed to shaft 102 on which roll 28 is also keyed. The shaft 102 is mounted in bearings carried by housing 104 which is slidably and adjustably secured to a block on a frame member in the same manner as previously described in connection with the aforementioned housings and blocks so that the position of roll 28 may be adjusted and checked relative to the other rolls.

Miter gear 70 cooperates with miter gear 110 secured to shaft 112 on which roll 30 is secured. The shaft 112 is mounted in bearings carried in housing 114 which is slidably adjustable on a block on the frame in the same manner as previously described in connection with the other housings and blocks whereby roll 30 can be adjusted and secured in position.

It is to be noted that each of the aforementioned housings carry micrometers to accurately check the position of the housings.

From the foregoing, it is manifest that the rolls 24, 26, 28, and 30 are each independently adjustable relative to the passage 32 and other rolls and that the shafts of each will be driven through the drive gearing mechanism described. The gears are all of the same size and have the same number of teeth so that all the rolls will travel at the same peripheral speed.

Each of rolls 24, 26, 28 and 30 consists of a core 120 provided with a covering 122 of a suitable material such as steel, rubber, plastic and the like. The peripheral tube contacting surface of each roll 24, 26, 28 and 30 is in the form of a continuous annular smooth concave groove 124 located between the beveled edges 126 and 128 which are of such angularity, such as 45°, to provide a space X between adjacent rolls. The radius of the concavity is at least equal to half the spacing between the peripheries of opposite rolls.

The shirring rolls are positioned to form the passage 32 of a size less than the diameter of the inflated tube passing therethrough whereby each roll will indent the tube without causing it to contact the mandrel and feed the same forward. The shirring rolls are of the same dimensions and the axes thereof are equidistantly spaced from the center of passage 32.

The relative spacing between the bevels of the rolls determines the pattern and shape of the pleats in the shirred tube. Thus, in a setup as shown in Figure 2, when the spacing X between the beveled edges of adjacent rolls is of rather large dimension (approaching the length of the chord of the groove as shown by the reference A) the nature of the pleats will be as shown in Figures 4 and 5. Referring to Figures 4 and 5, it will be observed that the pleat pattern consists of four sided diamond shaped pleats P of substantially the same dimensions disposed in rows extending longitudinally of the shirred tube, the pleats P in one row being disposed in staggered relationship with respect to the pleats in rows adjacent thereto. In this form, each of the diagonal fold lines F plus the connecting vertical lines V represent creases or folds and that the folds and fold intersections Q fall in a straight line parallel to the shirred stick axis as indicated by the line A—A. When the shirring rolls are assembled to provide a much smaller spacing X than that previously described, the nature and pattern of the pleats will be as shown in Figure 6. Referring now to Figure 6, it will be noted that the pattern consists of alternate rows of four sided diamond pleats P4 and six sided pleats P6 and pleats P4 being smaller than pleats P6 and the pleats in one row being in staggered relationship with the pleats in rows adjacent thereto. It is to be noted that in this embodiment the line A—A passing through the intersection Q of the diagonal fold lines F and vertical lines V is straight and parallel to the shirred stick axis as indicated by the line A—A.

In order to increase the traction of the rolls, and to control the pitch of the pleats, the concave peripheral annular groove 149 of each of the rolls may be provided with transversely extending teeth 150 as shown by roll 151 in Figures 7 and 8. The teeth 150 may be of uniform pitch or as shown in Figures 12 and 13, the teeth 152 may be of variable pitch in which embodiment the teeth may alternately gradually increase from a certain minimum to a maximum pitch and then gradually decrease to the previously mentioned minimum pitch. In each of the aforementioned toothed embodiments the pitch of the pleats formed in the tube corresponds to the pitch of the teeth of the shirring rolls provided that the pitch of the teeth is such that the formation of said pleats in the shirred tube is geometrically possible.

In a setup utilizing four toothed shirring rolls of the type and nature shown in Figures 7 and 8, there will be obtained a shirred tube having a cross section as shown in Figure 4 with the pleat pattern shown in Figures 5 or 6 depending on the spacing X (see Figure 2) between the beveled edges of adjacent rolls. With a setup utilizing four shirring rolls 153 of the type shown in Figures 12 and 13 there will be obtained a shirred tube having a cross section such as shown in Figure 14 and a pleat pattern depending on the spacing between the beveled edges as shown in Figures 5 and 6 except that the pitch of the pleat will vary in accordance with the pitch variance of the teeth as shown in Figure 15.

In the forms previously described the concave annular groove 149 or 155 as the case may be of each roll is such that the passage formed by the rolls remains concentric about the mandrel. It has been found that by making each groove follow a serpentine path as shown at 161 in Figure 16, progressively varying in depth from the axis of the roll and also progressively varying in placement in a direction parallel to the axis of the roll shaft and arranging the four rolls so that the high point of the upper roll groove is situated opposite the low point of the lower groove with the two side rolls at their medium depth of roll groove the passage provided by such rolls gyrates about the mandrel in an eccentric pattern. Grooves 160 as shown in Fig. 9 of serpentine form without variation in depth may also be employed. By appropriate positioning of the serpentine grooved paths the gyration of the passage in an eccentric pattern about the mandrel may take place once or many times in one rotation of the shirring rolls.

A shirred tube produced by eccentric gyration of the passage as just described produces a shirred tube having a cross section as shown in Figure 11. It is to be noted in the tube shown in Figure 11 the adjacent fold points of the shirred pleats are staggered in relation to each other with the result that the stick is shorter than the normal shirred stick and holds together without as much elongation tendered after compression. Depending on the spacing between the bevels of adjacent rolls the pleat pattern can be similar to that shown in Figures 5 and 6.

In the aforementioned embodiments the beveled edges are concentric to the axis of each roll. By making the bevel edges eccentric as shown in Figures 20 and 21 by the reference numerals 200 and 202 the annular groove 203 in roll 205 is displaced progressively and when four such rolls 205 are used in an assembly as shown in Figure 19 with the high point of the bevel in one roll adjacent to the low point of the bevel of the adjacent roll there is obtained alternate movements resulting in twisting of the tube in opposite directions and producing a shirred tube having a pleat pattern as shown in Figure 22 wherein the pleats are in rows parallel to the line Z—Z passing through the intersections of the fold lines F and the vertical lines V and which line follows a curved sinuous path producing a spiral effect in the shirred product and a stick prepared from such tube is not only shorter than the stick obtained from the shirring roll assemblies utilizing shirring rolls having bevelled edges concentric to the core center line, thus giving packaging advantages, but also held together without as much tendency to elongate after compression.

In each of the foregoing embodiments the annular concave groove, whether smooth, toothed, or serpentine has one tube contacting face. In still another embodiment each roll may be provided with two tube contacting faces. In one form of the invention this is obtained by bisecting any of the aforementioned annular grooves with an additional annular groove. Figure 23 shows an embodiment of a shirring roll 249 wherein the annular concave groove is bisected by an additional continuous smooth annular groove 250 producing two tube contacting faces 252. An assembly utilizing four rolls, each of which has two toothed contacting faces as shown in Figure 23, will produce a shirred tube having the pleat pattern shown in Figure 24, and which consists of rows of four sided diamond shaped pleats P, the pleats in one row being staggered with respect to the pleats in adjacent rows. It is to be noted that in this embodiment the pleats are smaller in length and there are a larger number of rows of pleats than in any of the preceeding embodiments.

The metering means may be any suitable arrangement appropriately positioned to receive the casing from the shirring rolls and deliver it at a rate less than that of the shirring rolls.

When a metering device is used, it is positioned as close to the shirring rolls as is feasible.

Satisfactory results can be obtained if the peripheral speed of the delivery rolls is or the rate of travel of tube after leaving the shirring is retarded to about ⅛ to 1/60 of the peripheral speed of the shirring rolls.

The invention may be employed in connection with shirring and compressing cellulose sausage casings of varying diameters and wall thicknesses. It is particularly useful in connection with casings ranging in diameter from 9/16 inch to 1⅛ inches and having wall thickness of from about .0006 or less to .003 inch or higher.

Though several illustrative embodiments of the invention have hereinbefore been described, it is to be understood that the shirring rolls of one embodiment may embody features of one or more of the other embodiments. Thus the shirring rolls may have an annular continuous concave peripheral groove, bisected or not with a second continuous annular groove, with or without teeth of equal or variable pitch on the tube contacting face or faces, and the tube contacting surface may follow a straight or serpentine path with or without alternately imparting a twisting movement in opposite directions to the tube.

Since it is obvious that various changes and modifications can be made in the above description without departing from the nature or spirit thereof, this invention is not restricted thereto except as set forth in the appended claims.

I claim:

1. In a tube shirring apparatus having a mandrel along which a tube in an inflated state is fed, a plurality of shirring rolls rotating at approximately the same peripheral speed and positioned to provide a passage through which the mandrel extends and the tube passes, said passage being of a size smaller than the diameter of the tube to permit the rolls to indent and feed the tube over said mandrel, said rolls being arranged with the respective center axis thereof equidistantly spaced from the center of the passage, each of said rolls having in its periphery an annular continuous concave groove progressively displaced with respect to its center axis, said rolls being positioned with the high point of one roll adjacent the low point of adjacent rolls.

2. In a tube shirring apparatus having a mandrel along which a tube in an inflated state is fed, two pairs of oppositely disposed shirring rolls rotating at approximately the same peripheral speed and positioned to provide a passage through which the mandrel extends and the tube passes, said passage being of a size smaller than the diameter of the tube to permit the rolls to indent and feed the tube over said mandrel, said rolls being arranged with the respective center axis thereof equidistantly spaced from the center of the passage, each of said rolls having in its periphery a continuous annular concave groove following a serpentine path progressively varying in depth from the center of the roll and also progressively varying in placement in a direction parallel to the roll shaft, the rolls in one pair being disposed with the high point of one roll opposite the low point of the roll opposite thereto and the rolls in the second pair being disposed with the medium depth of the respective grooves opposite each other.

3. In a tube shirring apparatus as set forth in claim 2 wherein the groove of each roll has teeth extending transversely thereof.

4. In a tube shirring apparatus as set forth in claim 3 wherein the teeth are of variable pitch.

5. In a tube shirring apparatus having a mandrel along which a tube in an inflated state is fed, a plurality of shirring rolls rotating at approximately the same peripheral speed, the peripheral surface of each of said rolls having a continuous concave groove following a serpentine path, said rolls being positioned to provide a passage through which the mandrel extends and the tube passes, said passage being of a size smaller than the diameter of the tube to permit the rolls to indent and feed the tube over said mandrel, said rolls being arranged with the respective center axis thereof spaced from the center of the passage.

6. In a tube shirring apparatus as set out in claim 5 wherein each serpentine groove progressively varies in depth from the center of the roll.

7. In a tube shirring apparatus as set out in claim 5 wherein each serpentine groove varies in placement in a direction parallel to the center line of the roll shaft.

8. In a tube shirring apparatus as set out in claim 5 wherein each serpentine groove progressively varies in depth from the center of the roll and progressively varies in placement in a direction parallel to the center line of the roll shaft.

9. In a tube shirring apparatus having a mandrel along which a tube in an inflated state is fed, a plurality of shirring rolls rotating at approximately the same peripheral speed, the peripheral surface of each of said rolls having teeth in a continuous concave groove following a serpentine path, said rolls being positioned to provide a passage through which the mandrel extends and the tube passes, said passage being of a size smaller than the diameter of the tube to permit the rolls to indent and feed the tube over said mandrel, said rolls being arranged with the respective center axis thereof spaced from the center of the passage.

10. In a tube shirring device as set forth in claim 9 wherein each serpentine groove progressively varies in depth from the center of the roll.

11. In a tube shirring device as set forth in claim 9 wherein each serpentine groove progressively varies in placement in a direction parallel to the center line of the roll.

12. In a tube shirring device as set forth in claim 9 wherein each serpentine groove progressively varies in depth from the center of the roll and progressively varies in placement in a direction parallel to the center line of the roll.

13. In a tube shirring apparatus having a mandrel along which a tube in an inflated state is fed, a plurality of shirring rolls rotating at approximately the same peripheral speed, the peripheral surface of each of said rolls having teeth of variable pitch in a continuous concave groove following a serpentine path, said rolls being positioned to provide a passage through which the mandrel extends and the tube passes, said passage being of a size smaller than the diameter of the tube to permit the rolls to indent and feed the tube over said mandrel, said rolls being arranged with the respective center axis thereof spaced from the center of the passage.

14. In a tube shirring device as set forth in claim 13 wherein each serpentine groove progressively varies in depth from the center of the roll.

15. In a tube shirring device as set forth in claim 13 wherein each serpentine groove progressively varies in placement in a direction parallel to the center line of the roll shaft.

16. In a tube shirring apparatus as set forth in claim 13 wherein each serpentine groove progressively varies in depth from the center of the roll and progressively varies in placement in a direction parallel to the center line of the shaft.

References Cited in the file of this patent

UNITED STATES PATENTS

| | | |
|---|---|---|
| 1,302,194 | Mayer | Apr. 29, 1919 |
| 1,761,189 | Brennan et al. | June 3, 1930 |
| 2,010,626 | Dietrich | Aug. 6, 1935 |
| 2,244,560 | Leavenworth | June 3, 1941 |
| 2,604,657 | Tipper | July 29, 1952 |